United States Patent [19]
Jin

[11] Patent Number: 5,920,470
[45] Date of Patent: Jul. 6, 1999

[54] CHARGE PUMPING CIRCUIT USED FOR A POSITIVE AND NEGATIVE CHARGE PUMP FORMED IN A SINGLE CIRCUIT

[75] Inventor: Kyoung Chon Jin, Kyoungki-do, Rep. of Korea

[73] Assignee: Hyundai Electronics Industries Co., Ltd., Ichon-shi, Rep. of Korea

[21] Appl. No.: 08/998,660

[22] Filed: Dec. 29, 1997

[30] Foreign Application Priority Data

Dec. 27, 1996 [KR] Rep. of Korea .................. 1996-73676

[51] Int. Cl.⁶ ..................................................... H02M 3/18
[52] U.S. Cl. ............................................. 363/60; 327/536
[58] Field of Search ............................ 363/60; 327/536; 331/25, 17

[56] References Cited

U.S. PATENT DOCUMENTS

| | | | |
|---|---|---|---|
| 4,807,104 | 2/1989 | Floyd et al. ................................ | 363/59 |
| 5,081,371 | 1/1992 | Wong ......................................... | 363/60 |
| 5,086,454 | 2/1992 | Hirzel ........................................ | 379/98 |
| 5,262,934 | 11/1993 | Price ......................................... | 363/60 |
| 5,306,954 | 4/1994 | Chan et al. ................................ | 363/60 |
| 5,606,491 | 2/1997 | Ellis ........................................... | 363/60 |
| 5,663,907 | 9/1997 | Frayer et al. ........................ | 365/185.18 |
| 5,748,032 | 5/1998 | Baek ........................................ | 327/536 |

*Primary Examiner*—Stuart N. Hecker
*Attorney, Agent, or Firm*—Jacobson, Price, Holman & Stern, PLLC

[57] ABSTRACT

The present invention is to provide to a charge pumping circuit capable of reducing the area of the layout by making the positive and negative charge pump in a single circuit, of enhancing the efficiency of the pump and of making the pumping speed high with the high driving voltage. The charge pumping circuit comprises: a charge pump for generating voltage amplitude which is over Vdd; a positive charge pump for transferring positive charges from the charge pump in response to a first control signal; a negative charge pump for transferring negative charges from the charge pump in response to the first control signal; and a controller for making a voltage, which is applied to the negative charge pump, to a ground voltage level at a negative charge operation, and for providing a voltage level for the negative charge pump to prevent charges from flowing to the negative charge pump.

5 Claims, 4 Drawing Sheets

5,920,470

CHARGE PUMPING CIRCUIT USED FOR A POSITIVE AND NEGATIVE CHARGE PUMP FORMED IN A SINGLE CIRCUIT

BACKGROUND OF THE INVENTION

1. Field of the Invention

The present invention relates generally to a charge pump circuit which can be used as a positive and negative charge pump, more particularly to a charge pump circuit in which the area of layout is reduced by making the positive and negative charge pump in a single circuit, and the efficiency of the pump is enhanced and in which the pumping speed becomes high by making the driving voltage high.

2. Description of Prior Art

Generally, memory devices need charge pumps which convert cell data to current signals, and the charge pumps can be divided into positive and negative charge pumps by the characteristics of the output charge. In a conventional charge pump circuit, the positive and negative charge pumps are separately constructed to obtain the desired voltage levels.

Accordingly, the conventional charge pump circuit has some problems in that a degree of integrated is low since the required capacitance of each pumping circuit is high, the quantity of transferred charges is small since the fixed power source is used as driving voltage of a pumping capacitor, and the quantity of charge losses is high since there are a number of diodes which transferring the charges.

SUMMARY OF THE INVENTION

An object of the present invention is to provide to a charge pumping circuit capable of reducing the area of the layout by making the positive and negative charge pump in a single circuit, of enhancing the efficiency of the pump and of making the pumping speed high with the high driving voltage.

According to the present invention, the charge pump can be used as a positive and negative charge pump, in which its area is reduced by making the positive and negative charge pump in a single circuit, the quantity of the transferred charges is increased by the high driving voltage of pumping capacitor, the quantity of the charge losses is reduced by the number of the transistors and the threshold voltage thereof.

In accordance with an aspect to the present invention, there are provided a charge pumping circuit in semiconductor device comprising: a charge pumping means for generating voltage amplitude which is over Vdd; a positive charge pumping means for transferring positive charges from the charge pumping means in response to a first control signal; a negative charge pumping means for transferring negative charges from the charge pumping means in response to the first control signal; and a control means for making a voltage, which is applied to the negative charge pumping means, to a ground voltage level at a negative charge operation, and for providing a voltage level for the negative charge pumping means to prevent charges from flowing to the negative charge pumping means.

The charge pumping means comprises: a first voltage transferring means for providing a voltage from a power supply to a first node without a voltage drop due to a threshold voltage in response to second and third control signals;

a control means for selectively transferring the voltage applied to the first node to a second node in response to a fourth second control signal; a second voltage transferring means for transferring the voltage applied to the second node to a third node without a voltage drop due to a threshold voltage in response to the third control signal; a voltage control means for increasing or decreasing the voltage applied to the third node in response to the second control signal; and a coupling means for coupling the third node to the positive and negative charge pumping means.

The positive charge pumping means comprises: a first transistor for transferring the voltage from the power supply to a fourth node in response to an inverted signal of the first control signal; a second transistor for transferring the output voltage from the charge pumping means to the fourth node in response to the first control signal; and a third transistor for transferring a voltage applied to the fourth node to a first output terminal in response to the output voltage from the charge pumping means, being coupled to a first capacitor.

The negative charge pumping means comprises: a fourth transistor for transferring the output voltage from the charge pumping means to a fifth node; a fifth transistor for transferring to the fifth node a voltage from a second capacitor, which is coupled to a second output terminal, in response to the output voltage from the charge pumping means; and a sixth transistor for transferring the voltage applied to the fifth node to a ground voltage level in response to the inverted signal of the first control signal.

The control means comprises: a seventh transistor for transferring the voltage from the power supply to a sixth node in response to the inverted signal of the first control signal at the positive charge operation, the sixth node being coupled to a bulk of the fifth transistor; an eight transistor for transferring to the ground voltage level the voltage applied to the sixth node in response to the first control signal at the negative charge operation; a ninth transistor for selectively coupling the sixth node to the eight transistor; and a tenth transistor for controlling the ninth transistor in response to the first control signal.

BRIEF DESCRIPTION OF THE DRAWINGS

Other objects and aspects of the invention will become apparent from the following description of the embodiments with reference to the accompanying drawings, in which.

DETAILED DESCRIPTION OF THE PREFERRED EMBODIMENTS

Figure 1:
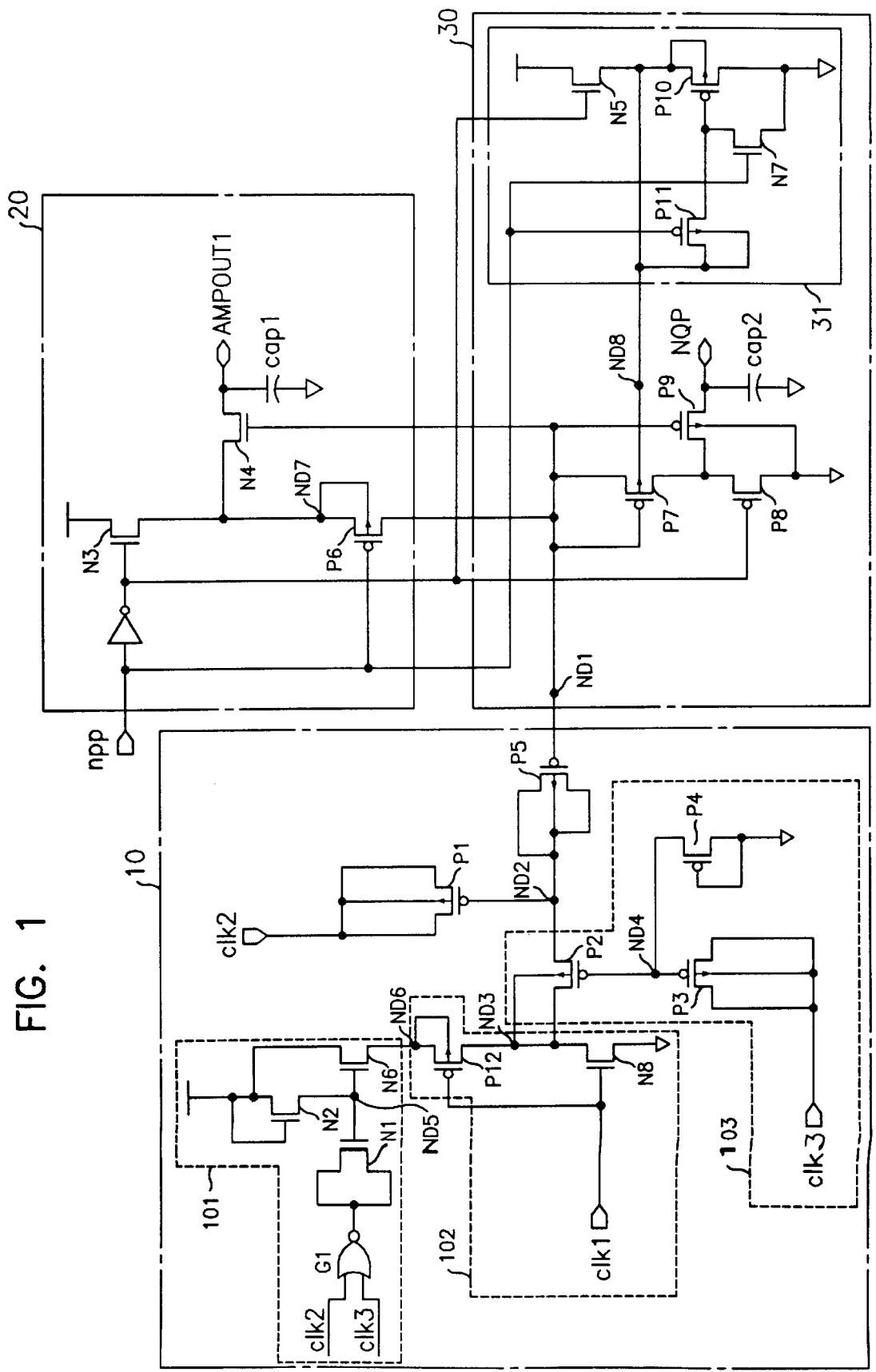
FIG. 1 shows a circuit structure of charge pump which can be used as a positive and negative charge pump in accordance with the invention.

As can be seen in the FIG. 1, a charge pump in accordance with the embodiment of the invention comprises a charge pumping part 10 generating voltage signal over a fixed value, a positive charge pump 20 and a negative charge pump 30 for transferring the charges generated in the charge pumping part 10. Also, the charge pump in accordance with the embodiment of the invention comprises a bulk bias control circuit enhancing the performance of the negative charge pump 30. In FIG. 1, each of elements, such as diodes and capacitors, is composed of n-channel and p-channel MOS transistors.

Figure 2:
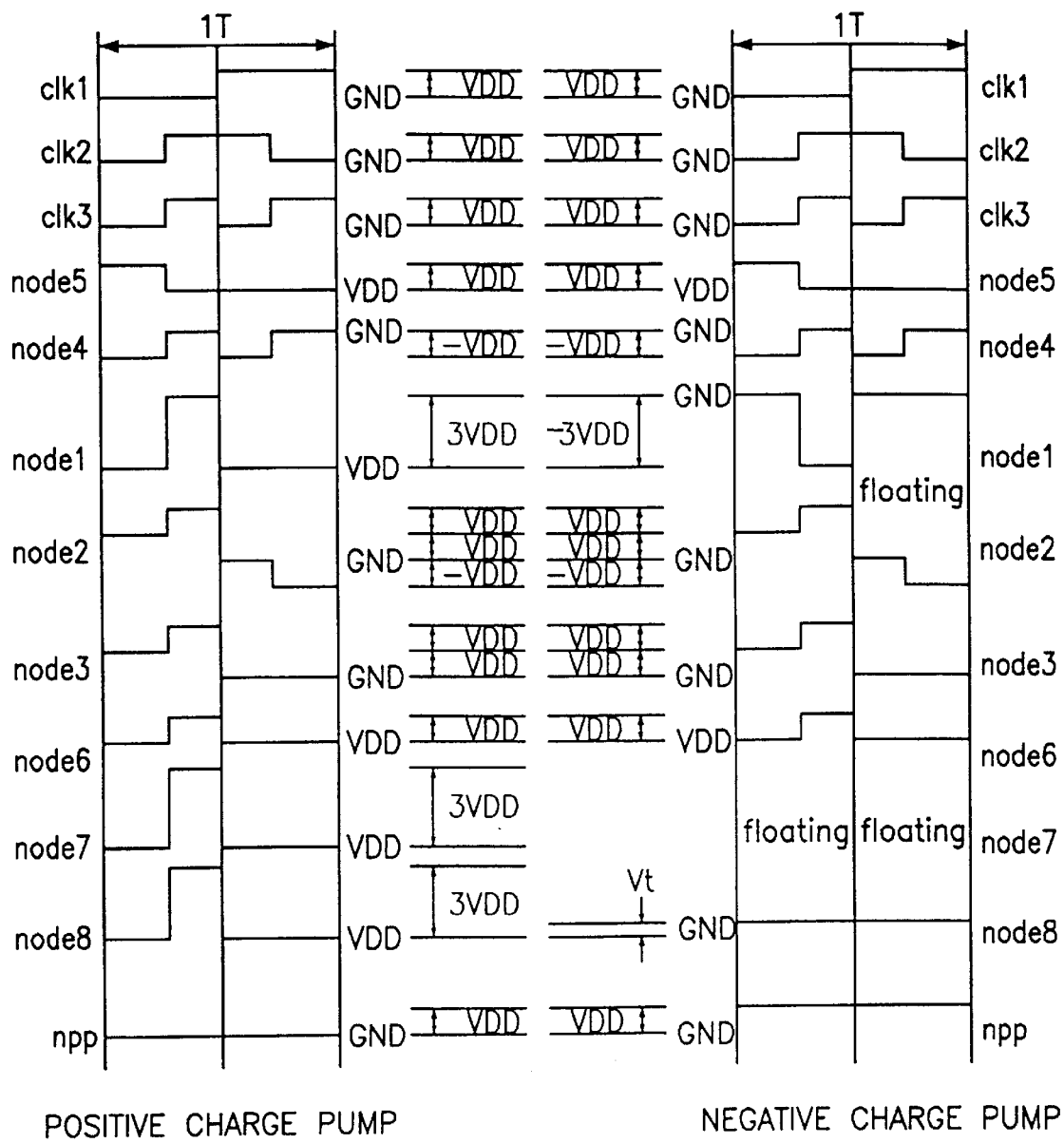
FIG. 2 shows wave forms of the charge pump which can be used as a positive and negative charge pump in accordance with the invention.

The charge pumping part 10 employs three clock signals clk1 to clk3. It should be noted that the wave forms of clock signals clk1 to clk3 are different from each other, as shown in FIG. 2. Also, the charge pumping part 10 includes a threshold voltage removing unit 101, a charge control unit 102, a charge transferring unit 103, a charge providing unit 104, and a driving capacitor P5.

Referring to FIG. 2, the pumping operation is performed when a clock signal clk1 is in a low voltage level. The voltage level of output node ND1 in the charge pumping part 10 is in a high voltage level of 3 Vdd when a control signal npp is in a low voltage level of 0 V. On the other hand, the voltage level of output node ND1 is in a low voltage level of -3Vdd when a control signal npp is in a high voltage level of 0.

Referring again to FIG. 1, in order to remove the threshold voltage drop, the threshold voltage removing unit 101 including a capacitor nl, a NOR gate G1 receiving the clock signals clk2 and clk3, a diode N2 and an NMOS transistor N6. The capacitor N1 coupled to the NOR gate G1 and the gate of the NMOS transistor N6. Also, the diode N2 is coupled between the gate and drain of the NMOS transistor N6. The capacitor N1 removes the threshold voltage Vt of the a NMOS transistor N6, the diode N2 supplies charges to a node ND5, the NMOS transistor N6 supplies the voltage of Vdd to a node ND6.

The charge control unit 102 includes a p-channel transistor P12 transferring the voltage at the node ND6 to the ND3 in response to the clock signal clk1 and an n-channel MOS transistor N8 which is coupled to the p-channel transistor P12 and carrying out a full-down operation in response to the clock signal clk1.

The charge transferring unit 103 includes the PMOS transistor P2 which selectively couples the node ND3 to a node ND2 in response to the clock signal clk3, a capacitor P3 which receives the clock signal clk3 and is coupled to the gate of the PMOS transistor P2, and a diode P4 which is coupled to the gate of the PMOS transistor to prevent the charges from flowing to the node ND4 from the ground. The PMOS transistor P2 prevents the charges from flowing from the node ND3 to the node ND2 and the capacitor P3 which drops the voltage of the node ND4 to below Vt.

The charge providing unit 104 includes a capacitor P1 to increase the voltage amplitude of the node ND2 to 3 Vdd. Also, the driving capacitor P5 is coupled to the node ND2 and then the charge pumping part 10 is coupled to the positive and negative charge pumps 20 and 30.

On the other hand, the positive charge pump 20 includes a n-channel MOS transistor N3 which supplies charges from the power supply Vdd under the control of the inverted signal of the control signal npp, an n-channel MOS transistor N4 which is coupled the n-channel MOS transistor N3 to transfer the charges to the positive output terminal AMPOUT1, and a diode P6 which stops the supply of the positive charge from the node ND7 at the negative charge operation in response to the control signal npp. Also, a capacitor cap1 is couple in parallel to the positive output terminal AMPOUT1 .

The negative charge pump 30 includes a diode P7 which is coupled to the node ND1, a p-channel transistor P8 which is coupled to the diode P7 and then performs a full-down operation in response to the control signal npp, and a p-channel transistor P9 which is coupled to the source of the p-channel transistor P8. Also, the p-channel transistor P8 is coupled to a capacitor cap2 which is couple in parallel to the negative output terminal NQP. The diode P7 prevents the flowing of positive charge. The p-channel transistor P8 prevents the positive charges from flowing to the ground and smothes the supply of negative charges. The p-channel transistor P9 removes the positive charge from the capacitor cap2.

Further, the pump control unit 31 includes an p-channel MOS transistor P10 makes the voltage at the node ND8 a ground voltage level during the negative charge operation. An n-channel MOS transistor coupled to the p-channel MOS transistor P10 supplies the voltage of Vdd to in order to prevent the charge from flowing to the bulk in response to the inverted signal of the control signal npp. A p-channel MOS transistor P11 formed between the gate of the p-channel MOS transistor P10 and the none ND8. The n-channel transistor N7 which fixes the node ND8 to the ground level in response to the control signal npp, the diode P10 makes the node ND8 ground, and transistor P11 closes the gate of the diode P10 during the positive operation. At the positive charge operation, an n-channel MOS transistor N5 in the pump control unit 31 supplies the voltage level of Vdd to the node ND8 to prevent charges from flowing to the bulk of the diode P7.

The charge pumping circuit which can be used as positive and negative charge pumps in accordance with the embodiment of the invention can be operated as a positive charge pump in case where the control signal npp is ground level, and the procedure is as follows.

As can be seen in the FIG. 2, when the first clock signal clk1 is in the state of low, the node ND2 becomes Vdd. When the second clock signal clk2 is in a high state, the node ND2 becomes 2 Vdd, and the positive charge of the node ND1 is output by way of the p-channel MOS transistor P6 and the n-channel MOS transistor N4. When the first clock signal clk1 is in a high state, the node ND2 is in the ground voltage level.

And the second clock signal clk2 is in a low state, the node ND2 is in a voltage level of GND-Vdd, the positive charges are input from the Vdd to the node ND1 through the p-channel MOS transistor P6 and the n-channel MOS transistor N3.

Also, the charge pump which can be used as positive and negative charge pump in accordance with the embodiment of the invention can be operated as a negative charge pump in the case that the control signal npp is Vdd, and the procedure is as follows.

As can be seen in the FIG. 2, when the first clock signal clk1 is in a low the state, the node ND2 becomes Vdd. When the second clock signal clk2 is in a high state, the node ND2 becomes 2 Vdd, and the positive charge of the node ND1 is output by way of the diodes P7 and P1. When the first clock signal clk1 is in a high state, the node ND2 is in the ground voltage level.

And the second clock signal clk2 is in a low state, the node ND2 is in a voltage level of GND-Vdd, the positive charge is input from the capacitor cap2 to the node ND1 through the p-channel MOS transistor P9.

Figure 3:
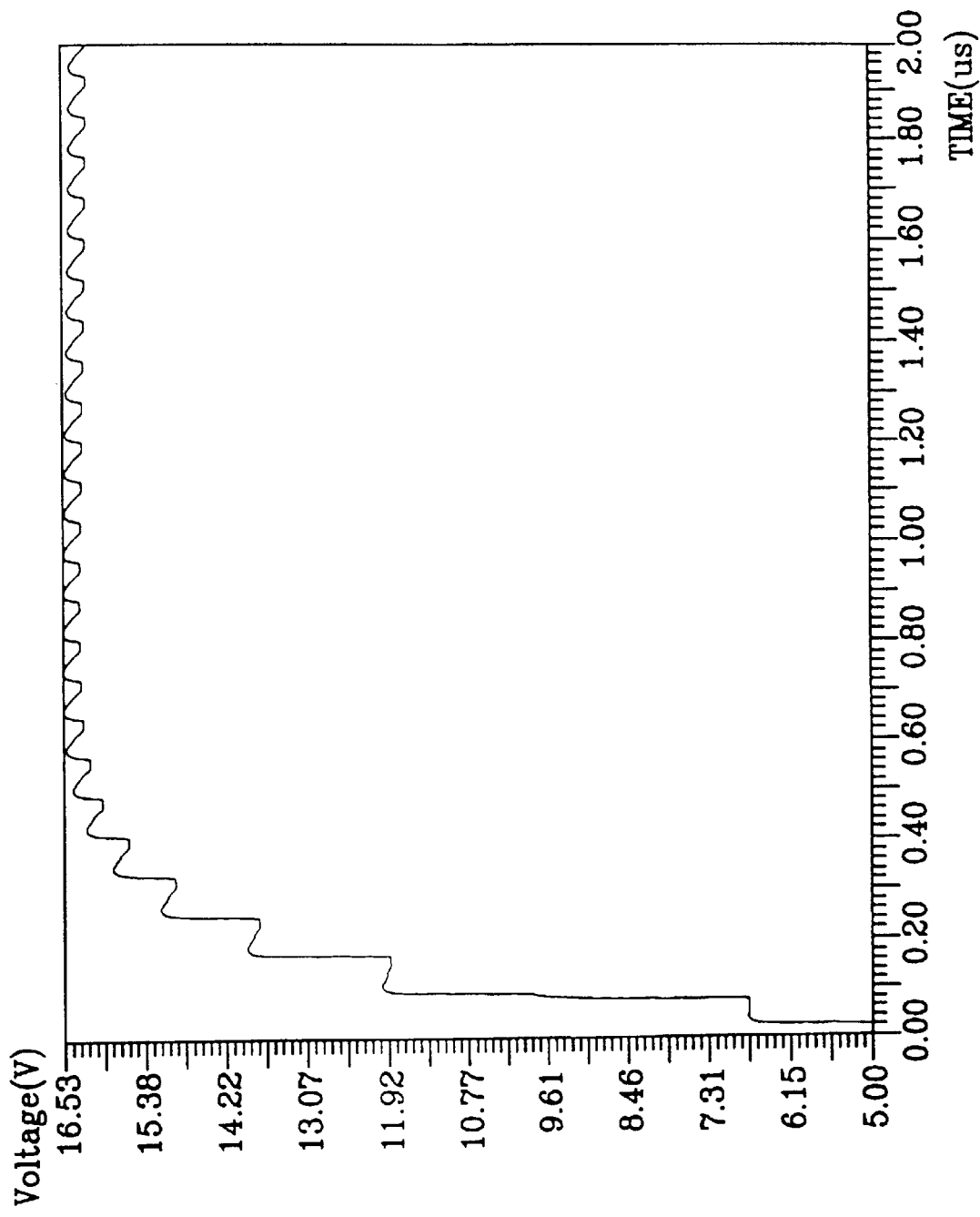
FIG. 3 is a plot showing the positive charge pumping operation according to the present invention.
Figure 4:
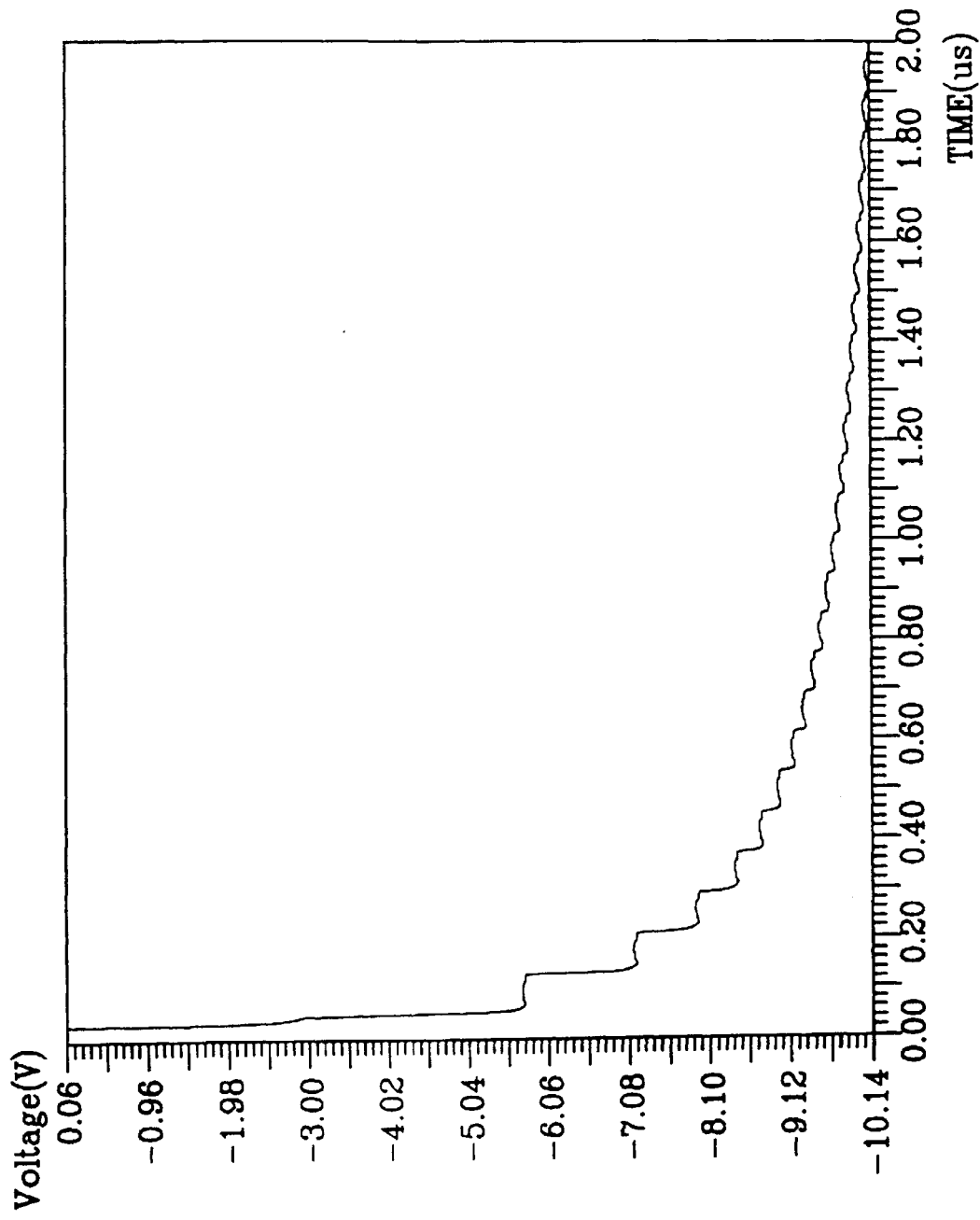
FIG. 4 is a plot showing the negative charge pumping operation according to the present invention.

The charge pump of the invention can be operated by making short of the node ND2 and the node ND1 after removing the third clock clk3, diode P2, capacitor P3 and capacitor P4. At this time, the voltage of the node ND2 is 2 Vdd and can be used to reduce the voltages of output stage AMPOUT1 of positive part 20 and output stage NQP of negative diode part 30. FIGS. 3 and 4 are a plot showing the positive and negative charge pumping operations according to the present invention, respectively.

While the invention has been described in terms of a single preferred embodiment, those skilled in the art will recognize that the invention can be practiced with modification within the spirit and scope of the appended claims.

As apparent from the above description, the charge pump of the invention can increase the clock voltage of driving capacitor and therefore the desired voltage level can be obtained efficiently without using many diodes as in the conventional art.

What is claimed is:

1. A charge pumping circuit in semiconductor device comprising:

a charge pumping means for generating voltage amplitude which is over Vdd;

a positive charge pumping means for transferring positive charges from the charge pumping means in response to a first control signal;

a negative charge pumping means for transferring negative charges from the charge pumping means in response to the first control signal; and a control means for making a voltage, which is applied to the negative charge pumping means, to a ground voltage level at a negative charge operation, and for providing a voltage level for the negative charge pumping means to prevent charges from flowing to the negative charge pumping means.

2. The charge pumping circuit according to claim 1, wherein the charge pumping means comprises:

a first voltage transferring means for providing a voltage from a power supply to a first node without a voltage drop due to a threshold voltage in response to second and third control signals;

a control means for selectively transferring the voltage applied to the first node to a second node in response to a fourth second control signal;

a second voltage transferring means for transferring the voltage applied to the second node to a third node without a voltage drop due to a threshold voltage in response to the third control signal;

a voltage control means for increasing or decreasing the voltage applied to the third node in response to the second control signal; and a coupling means for coupling the third node to the positive and negative charge pumping means.

3. The charge pumping circuit according to claim 2, wherein the positive charge pumping means comprises:

a first transistor for transferring the voltage from the power supply to a fourth node in response to an inverted signal of the first control signal;

a second transistor for transferring the output voltage from the charge pumping means to the fourth node in response to the first control signal; and a third transistor for transferring a voltage applied to the fourth node to a first output terminal in response to the output voltage from the charge pumping means, being coupled to a first capacitor.

4. The charge pumping circuit according to claim 2, wherein the negative charge pumping means comprises:

a fourth transistor for transferring the output voltage from the charge pumping means to a fifth node;

a fifth transistor for transferring to the fifth node a voltage from a second capacitor, which is coupled to a second output terminal, in response to the output voltage from the charge pumping means; and a sixth transistor for transferring the voltage applied to the fifth node to a ground voltage level in response to the inverted signal of the first control signal.

5. The charge pumping circuit according to claim 2, wherein the control means comprises::

a seventh transistor for transferring the voltage from the power supply to a sixth node in response to the inverted signal of the first control signal at the positive charge operation, the sixth node being coupled to a bulk of the fifth transistor;

an eight transistor for transferring to the ground voltage level the voltage applied to the sixth node in response to the first control signal at the negative charge operation;

a ninth transistor for selectively coupling the sixth node to the eight transistor; and a tenth transistor for controlling the ninth transistor in response to the first control signal.

* * * * *